…

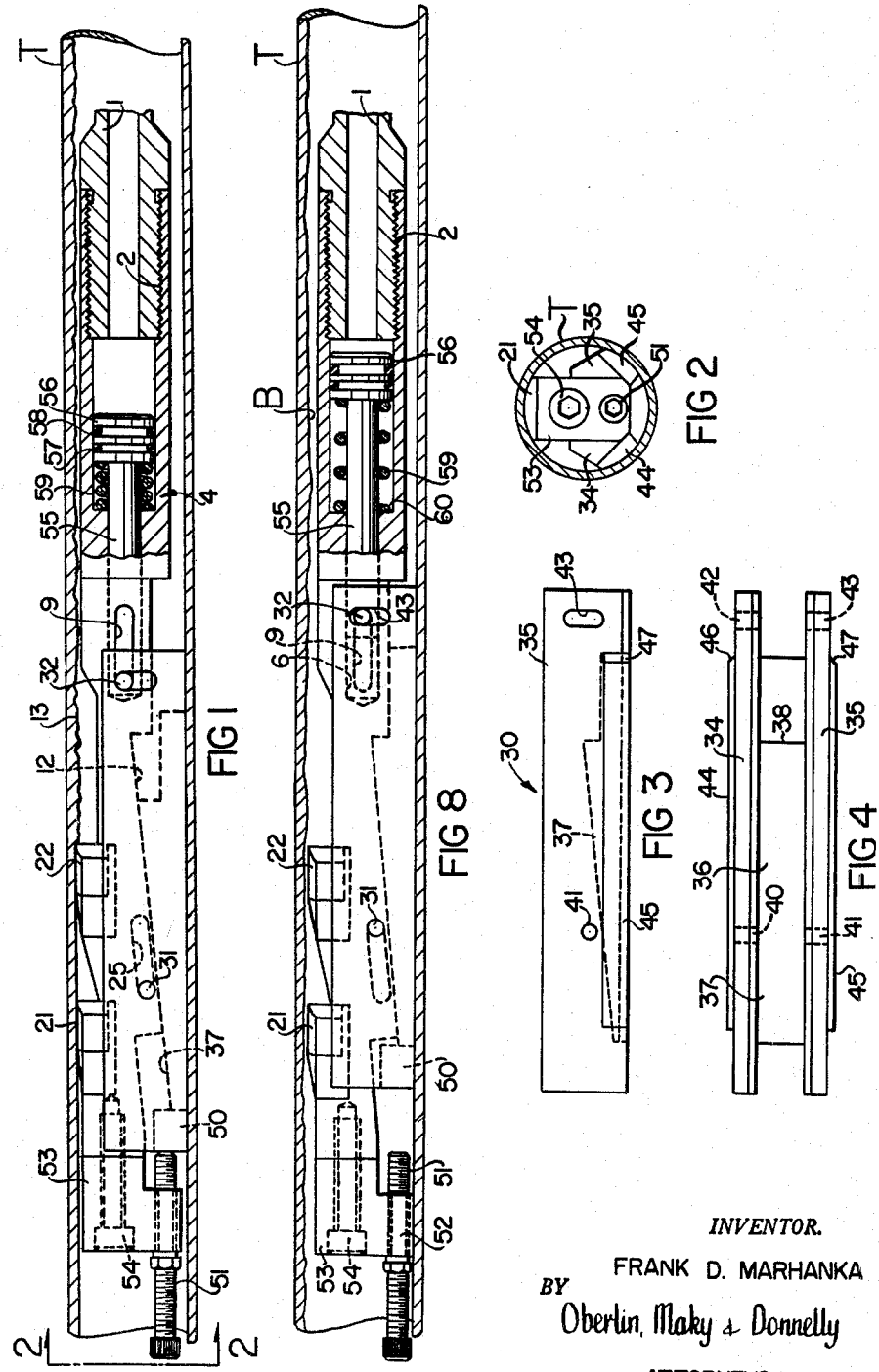

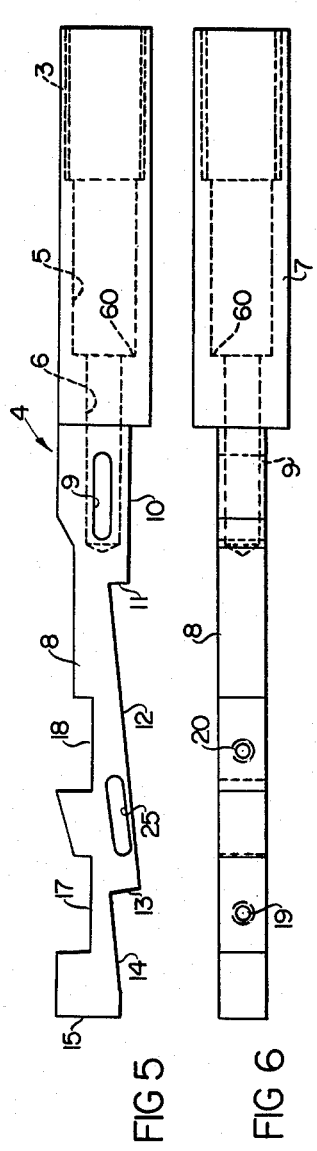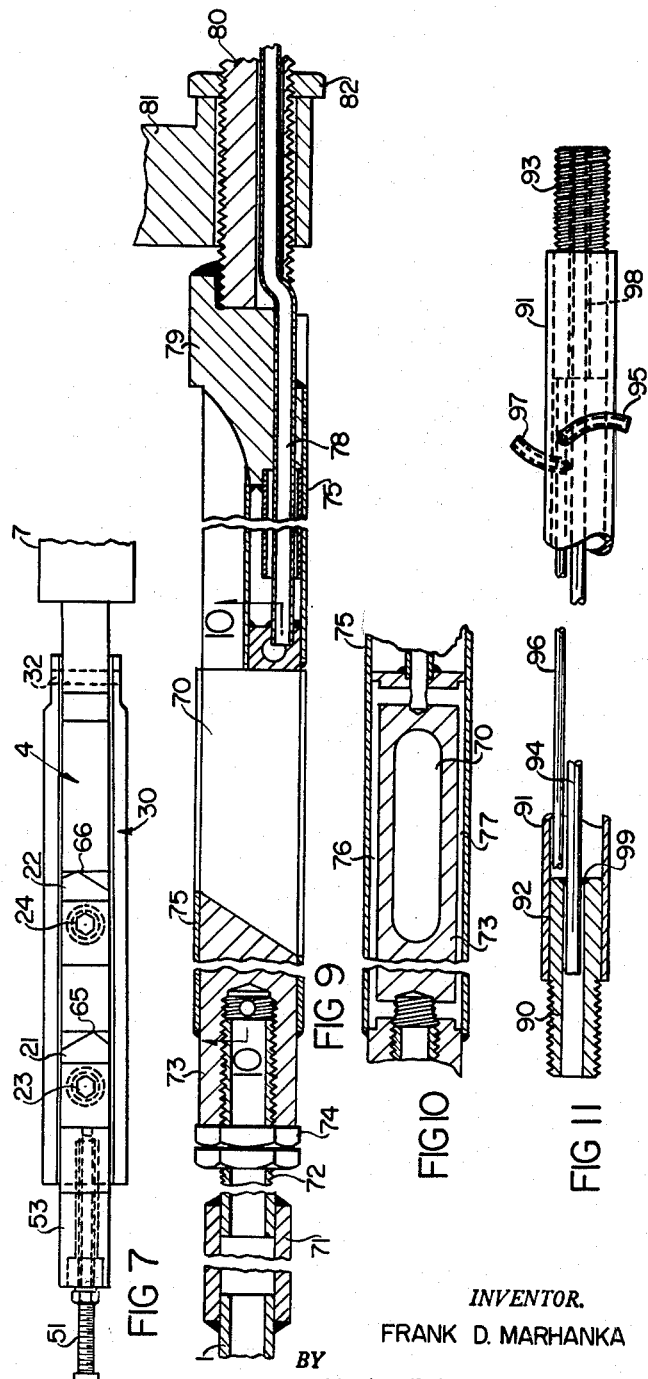

United States Patent Office 3,177,776
Patented Apr. 13, 1965

3,177,776
SCARFING TOOL
Frank D. Marhanka, Florissant, Mo., assignor to The Yoder Company, Cleveland, Ohio, a corporation of Ohio
Filed Sept. 7, 1961, Ser. No. 136,613
11 Claims. (Cl. 90—24)

This invention relates generally, as indicated, to a scarfing tool and more particular to a bead trimming and removal tool adapted for use in conjunction with the electrical welding of small diameter pipe.

Internal bead removal is a problem in all sizes of electrically welded pipe, but presents an especial problem in the case of relatively small diameter conduits such as piping for use in plumbing or as conduits for electrical wiring. The internal bead which sometimes may be jagged and sharp is capable of cutting electrical insulation or creating turbulence or line blockage in the case of fluid pipes. Moreover in the manufacture of some small diameter tubing by electrical welding, it may not be necessary to remove the bead depending on the ultimate use to which the pipe is to be put. Accordingly, a scarfing tool for bead trimming and removal which can selectively be applied to the bead is to be desired.

Piston-cylinder assemblies and adjusting screw mechanisms have been employed to position scarfing tools in tube welding operations, but heretofore the selective use of the scarfing tool has not been provided for by adjusting screws nor have piston-cylinder assemblies been employable in extremely small diameter tubing. With certain types of scarfing tools, the tool may extend too far into the bead and actually remove a portion of the wall of the tube sufficient to render the tubing defective.

It is accordingly a principal object of the present invention to provide a scarfing tool for use in conjunction with tube welding operations which can selectively be applied to trim and remove the internal bead normally produced along the seam of such tubing.

It is another important object of the present invention to provide a unique scarfing tool which can be employed with the desired selectivity in tubes of extremely small diameter.

A still further object of the present invention is the provision of a scarfing tool which incorporates positive pressure applying means for positioning the tool into the bead to be removed while yet preventing excessive tool pressure.

It is still another object to provide a scarfing tool incorporating such positive tool pressure applying means which is produced of relatively few simple parts and which will also permit removed chips or chip curlings to be easily flushed from the tube.

It is yet another object to provide such scarfing tool which can be used with induction or contact tube welding apparatus.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings—

FIG. 1 is a longitudinal section of a scarfing tool in accordance with the present invention showing such tool in its active bead engaging position;

FIG. 2 is a transverse section taken substantially on the line 2—2 of FIG. 1;

FIG. 3 is a detail side elevation of the bottom slide assembly of the present invention;

FIG. 4 is a top plan view of such slide assembly;

FIG. 5 is a detail side elevation of the tool frame of the present invention;

FIG. 6 is a top plan view of such tool frame;

FIG. 7 is a top plan view of the assembled tool frame and bottom slide showing the cutting tools inserted;

FIG. 8 is a longitudinal sectional view similar to FIG. 1 showing the tool in its retracted position;

FIG. 9 is a fragmentary longitudinal section of one form of mandrel on which the tool of the present invention may be mounted;

FIG. 10 is a horizontal section taken substantially on the line 10—10 of FIG. 9; and FIG. 11 is a fragmentary view partially broken away of another form of mandrel that may be employed with the present invention.

Referring now to the annexed drawings and more particularly to FIGS. 1 and 8, it will be seen that the scarfing tool of the present invention is comprised of a tubular support or mandrel 1 which extends within the tubing T back through the welding zone and is fastened at some appropriate point in the forming mill. This hollow mandrel has a reduced diameter threaded end portion 2 which receives a tapped tubular portion 3 of a tool frame member 4. The tool frame member 4 includes a hollow cylindrical portion 5 adjacent the tapped portion and a reduced diameter hollow extension 6 coaxial therewith. The cylindrical hollow portion 5 is provided in an enlarged end portion 7 of the tool holder and the reduced diameter extension extends from such enlarged portion 7 into a generally rectangular sectional extension 8. A horizontal laterally extending slot 9 extends through the proximal end of such extension communicating with the hollow longitudinally extending extension 6. The bottom surface of the extension includes a horizontal surface 10 terminating in an upwardly directed shoulder 11 which surface in turn terminates in an inclined sloping surface 12 which extends the major portion of the extension. The surface 12 terminates in a surface 13 normal thereto which joins the surface 14 extending slightly downwardly parallel to the surface 12 to the end face 15 of the extension. The top surface of the extension includes two cutout portions 17 and 18 with respective drilled and tapped holes 19 and 20 extending vertically through the extension by which cutting tools 21 and 22 may be fastened to the tool frame within such tool receptacles by suitable fastening means such as the screws 23 and 24 (note FIG. 7). In this manner, carbide tip cutting tools can easily be inserted and replaced in the tool frame 4.

Closely adjacent the inclined bottom surface 12 there is provided a slot 25 extending between the tool receptacles 17 and 18, which slot extends laterally through the extension 8, and is also inclined and parallel to the surface 12.

Another major component of the tool is the bottom slide assembly 30 shown in detail in FIGS. 3 and 4 which is held to the tool frame by two dowel pins 31 and 32 fitting respectively in the slots 25 and 9 in the tool frame 4. The bottom slide assembly comprises an elongated U-shape member having upstanding side frames 34 and 35 connected by a bottom web 36. Such bottom web 36 is provided with an inclined top surface 37 which corresponds roughly to the bottom surface 12 of the tool frame 4. Such surface terminates rearwardly in a rearwardly facing shoulder 38 which cooperates with the shoulder 11 of the tool frame member to provide a stop for the relative positions of the bottom slide assembly and such tool frame.

The dowel pin 31 fits through aligned apertures 40 and 41 in the sides 34 and 35 respectively and similarly the dowel pin 32 fits through vertically elongated slots 42 and 43 at the rear of the sides 34 and 35. As seen in FIG. 2, the bottoms of the sides 34 and 35 are provided with downwardly and outwardly facing cylindrical surface carbide wear strips 44 and 45. Since the tube in FIGS. 1 and 8 will be moving to the left, the leading edges of such wear strips may be beveled at approximately 45° as shown at 46 and 47. These symmetrically disposed carbide, brazed wear strips serve to support the bottom slide assembly on the interior bottom surface of the tube T for sliding movement therealong as the tube is moved therepast thus to center and position the cutting tools.

A block 50 may be secured between the sides 34 and 35 by any suitable means, preferably dowel pins, to serve as a stop abutment for adjustable stop screws 51. Such stop screw 51 is supported for longitudinal adjustment in a downwardly extending portion 52 of stop screw bracket 53. Such bracket may be secured to the end surface 15 of the tool frame 4 by a suitable screw 54 or the like. As will hereinafter become evident, the adjustable stop screw 51 will control the extent of movement permitted between the tool frame and the bottom slide assembly.

The dowel pin 32 not only extends through the vertically elongated slots 42 and 43 in the bottom slide assembly and the horizontally elongated slots 9 in the tool frame, but also through the rod 55 of a piston 56. Such piston 56 fits within the cylindrical opening 5 and the rod, of course, fits within the cylindrical reduced diameter opening 6 in the tool frame 4. The position may be provided with annular sliding seals as shown at 57 and 58 and a compression spring 59 fits between the shoulder 60 between the cylindrical cavity 5 and the reduced diameter rod cylindrical receiving portion 6 and the piston 56. Air under pressure supplied through the tubular mandrel 1 which is threaded to the tool frame member as shown at 2 may be employed to move the piston to the left as seen in FIGS. 1 and 8 and the spring 59 will move the piston to the right when such air pressure is relieved.

The dowel pin 32 is, of course, secured to the rod 55 for movement therewith and movement of the dowel pin with respect to the tool frame is permitted by the elongated slot 9. Thus when air pressure is supplied through the mandrel 1 to the piston 56, movement of the piston and rod to the left will cause the pin to move to the left through slots 9. This movement causes the pin 31 to move downwardly and forwardly through the slot 25 and, of course, the bottom slide assembly will also move downwardly and forwardly. However, since the bottom slide assembly is resting upon the interior bottom of the tube T, the tool frame will be raised causing the cutters 21 and 22 to engage the jagged bead B formed by the welding operation. Vertical movement of the tool frame and the piston therein is permitted with respect to the bottom slide assembly by means of the vertically elongated slots 42 and 43 which confine the bottom slide assembly for longitudinal movement with the rod 55 and thus the piston 56. In addition to the dowel pin 31 riding within the slot 25, the surface 36 on the bottom slide assembly will engage the surface 12 as the bottom slide assembly is moved forward thus raising the tool frame and the cutters 21 and 22 thrusting them into the bead B to be trimmed. As the bottom slide assembly moves to the left raising the tool frame and the cutters held thereby, the block 50 will engage the tip of the adjusting screw 51 to provide a predetermined limit for the relative movement of the bottom slide and tool frame. As long as air pressure is maintained, the tool will remain in the scarfing position shown in FIG. 1 with the spring 59 being compressed. When the air pressure is released, the depressed spring 59 expands driving the piston 56 backwards and the bottom slide assembly will move with the piston rod due to the pin 32 being within the vertically elongated slots to pull the same backwardly causing the pin 31 to ride up the slot 25 permitting the tool frame to fall down and the cutters will drop out of bead engagement. It is noted that the translation of the longitudinal movement of the piston into the vertical movement of the tool frame imparts a tremendous mechanical advantage to the assembly whereby the force of the piston may be employed firmly to hold the bead cutting tools 21 and 22 in scarfing position. The mechanical advantage is, of course, governed by the inclination of the slot 25 and the surfaces 12 and 36.

As seen in FIGS. 2 and 7, each of the cutting tool inserts 21 and 22 may be provided with a carbide tip cutting tool, the top surface of which is substantially cylindrical and conforms to the tube interior surface. The tips of the respective tools are, however, offset from the center or bead seam as shown at 65 and 66 whereby the proper cutting or scarfing action will cleanly and effectively remove the bead when the piston drives the tool into engagement therewith.

Referring now to FIGS. 9 and 10, there is illustrated one form of mandrel to which the scarfing tools of the present invention may be attached. More particularly, such mandrel may be employed with a high frequency induction welder wherein the mandrel supports a magnetic core within the receptacle 70 in the welding zone. The tool mandrel 1 may be coupled through sleeve 71 to a tubular rod 72 threaded into the core receiving member 73 and held in place by nuts 74. The core receiving member is preferably made of a non-magnetic material and a sleeve 75 encases the cradle or core receiving member 73 and is provided with suitable slots for coolant fluid circulation if desired. The cradle 73 includes passageways 76 and 77 which pass laterally around the receptacle 70 for the core and communicate with the tubular rod 72 at the forward end of the cradle and with tube 78 at the trailing end of the cradle. An anchor 79 is welded or otherwise suitably secured to the sleeve 75 and the tube 78 passes therethrough and through threaded member 80 which may be welded to the anchor. The threaded member 80 is surrounded by the proximal end of mandrel rod support 81 which may pass outwardly through the open tube in the forming section. A nut 82 threaded on the member 80 may be employed to hold the mandrel assembly against the mandrel rod support. Air or other suitable fluid for the operation of the piston 56 may then be supplied through the tube 78 which passes through the threaded member 80, the anchor 79 and into the cradle 73. Such fluid passes through the passageways 76 and 77 about the core and then into the tubular rod 72 to communicate through sleeve 71 with the hollow tube 1 which communicates directly with the cylinder of the piston-cylinder assembly. In operation, it has been found that no special coolant for the scarfing tool is necessary and the used impeder coolant fluid which is dumped into the moving tube in the welding zone is sufficient to flush the bead chips down the tube.

Referring now to FIG. 11, there is shown an alternative form of scarfing tool holding rod that may be employed with the present invention. The rod of FIG. 11 may, for example, be employed with a resistance welding unit and such rod includes a threaded hollow rod 90 on one end thereof which may be coupled to the hollow mandrel 1 or threaded directly into the interior of the tool holder as shown at 2. A tube such as a ¾ inch brass tube 91 may be brazed on the rod 90 as shown at 92 and similarly a threaded steel plug 93 may be provided in the opposite end similarly secured within the brass tube 91. An air line 94 which may, for example, be a copper tube is provided extending between the hollow rod 90 and the hollow plug or rod 93. The mandrel rod support may be secured to the threaded plug or hollow rod 93 in the same manner as disclosed in FIG. 9. The tube 91 extending through the welding zone may be supplied with a water or like coolant through inlet tube 95 which communicates with a tube 96 extending longitudinally within the mandrel. Such tube is preferably brazed or silver soldered to the mandrel wall and water or like coolant directed through the tube 95 and thus tube 96 will flow into the mandrel 91 and out through a similar tube 97. If desired, a thin rubber sleeve or the like 98 may be employed to seal the tube 94 in the plug 93 and the opposite end of such tube may be brazed or silver soldered in the hollow rod 90 as shown at 99.

It can now be seen that there is provided a remotely operable scarfing tool which can be employed in tube welding with either high frequency reduction welding units or with more conventional contact resistance welding units. Since with the production of certain tubing, it may not be required to remove the bead, the scarfing tools can selectively be positioned not to engage the bead thus not to wear the tools 21 and 22 accordingly increasing the life thereof. However, when a production of tube requires the bead to be removed, the piston-cylinder assembly which fits substantially coaxial within the tube to be welded need only be actuated to drive the tools into engagement with a firm cutting force against the bead.

The unit illustrated has actually been tested in the production of 1 inch diameter tubing and it can readily be seen that even with extremely small tube sizes, it is possible to employ a substantial pressure applying force to engage the tools against the bead thus properly to remove the bead.

Other modes of applying the principle of the invention may be employed, change being made as regards the details described, provided the features stated in any of the following claims or the equivalent of such be employed.

I, therefore, particularly point out and distinctly claim as my invention:

1. An inner weld bead scarfing tool for welded tubing comprising an elongated mandrel adapted to enter the open seam of such tubing in advance of the welding station, cutting tool support means mounted on the end of said mandrel, anti-friction guide means connected to said support means adapted to engage circumferential regions of the inner surface of such tubing to center and position said cutting tool support means with regard to such welded tubing, a cutting tool mounted on said support means in position to engage and remove such inner weld bead, and means to move said support means vertically selectively with respect to said guide means to drive said tool into engagement with such weld bead, said means to move said support means vertically comprising a single acting piston-cylinder assembly extending longitudinally within the proximal end of said support means.

2. A weld bead scarfing tool as set forth in claim 1 including means interconnecting said piston-cylinder assembly and said guide means to raise said support means and thus said tool through a mechanical advantage connection between said guide means and said support means.

3. A weld bead scarfing tool as set forth in claim 2 including spring return means on said piston-cylinder assembly adapted automatically to lower said support means with respect to said guide means when the pressure in said piston-cylinder assembly is relieved.

4. An inner weld bead scarfing tool for welded tubing comprising an elongated mandrel adapted to enter the open seam of such tubing in advance of the welding station, a cutting tool support body mounted on the end of said mandrel, anti-friction guide means supporting said body adapted to engage circumferential regions of the inner surface of such tubing properly to position said support body, cutting tool means mounted on said support body and positioned to engage and remove such inner weld bead, said guide means comprising a U-shape elongated assembly having guide shoes on opposite vertical sides thereof, pin and slot connections interconnecting said guide means and said support body for relative vertical and horizontal movement, and means operative vertically relatively to move said guide means with respect to said support body to drive said cutting tool means into engagement with such seam weld bead.

5. An inner weld bead scarfing tool for welded tubing comprising an elongated mandrel adapted to enter the open seam of such tubing in advance of the welding station, a cutting tool support body mounted on the end of said mandrel, anti-friction guide means mounted on said support body adapted to engage laterally offset circumferential regions of the inner surface of such tubing to position said support body with regard thereto, a cutting tool mounted on said support body in position to engage and remove such inner weld bead, said guide means comprising a U-shape assembly adapted to support said support body therein, a piston-cylinder assembly in said support body, and means interconnecting said piston-cylinder assembly with said guide means for longitudinal movement therewith.

6. A weld bead scarfing tool as set forth in claim 5 including means interconnecting said guide means and said piston-cylinder assembly to permit relative vertical movement between said guide means and said piston-cylinder assembly.

7. The scarfing tool as set forth in claim 6 including inclined surface means connecting said guide means and tool support body to translate longitudinal movement of said guide means into vertical movement of said tool support body.

8. A scarfing tool as set forth in claim 7 wherein said inclined surface means comprises an inclined slot in said tool support body, and pin means in said guide means extending through said slot.

9. A scarfing tool as set forth in claim 8 including an inclined top surface on said guide means and a similarly inclined bottom surface on said tool support body adapted mutually to cooperate to raise said tool support body upon longitudinal movement of said guide means.

10. A scarfing tool as set forth in claim 9 including adjustable stop means adapted to limit the vertical movement of said tool support body with respect to said guide means.

11. An inner weld bead scarfing tool for welded tubing and the like comprising an elongated mandrel adapted to enter the open seam of such tubing in advance of the welding station, cutting tool support means mounted on the end of said mandrel, anti-friction guide means beneath said support means supporting said cutting tool support means, a cutting tool mounted on said support means in position to engage and remove such inner weld bead, piston means including a piston rod mounted in said support means, means interconnecting said guide means with said piston means for longitudinal movement therewith, said guide means having a vertically extending elongated slot means adapted to engage a pin extending through the rod of said piston means, a longitudinally elongated slot in said support means adapted to accommodate said pin for longitudinal movement, and inclined surface means on said support means adapted to engage said guide means for translating longitudinal movement of said guide means with respect to said support means into vertical movement of said support means and thus said cutting tool to drive said cutting tool into engagement with such bead.

References Cited by the Examiner
UNITED STATES PATENTS

| | | | |
|---|---|---|---|
| 2,011,725 | 8/35 | Morton | 90—24.02 |
| 2,243,197 | 5/41 | De Foire | 90—24.02 |
| 2,900,879 | 8/59 | Norton et al. | 90—24.02 |

WILLIAM W. DYER, JR., *Primary Examiner.*